UNITED STATES PATENT OFFICE.

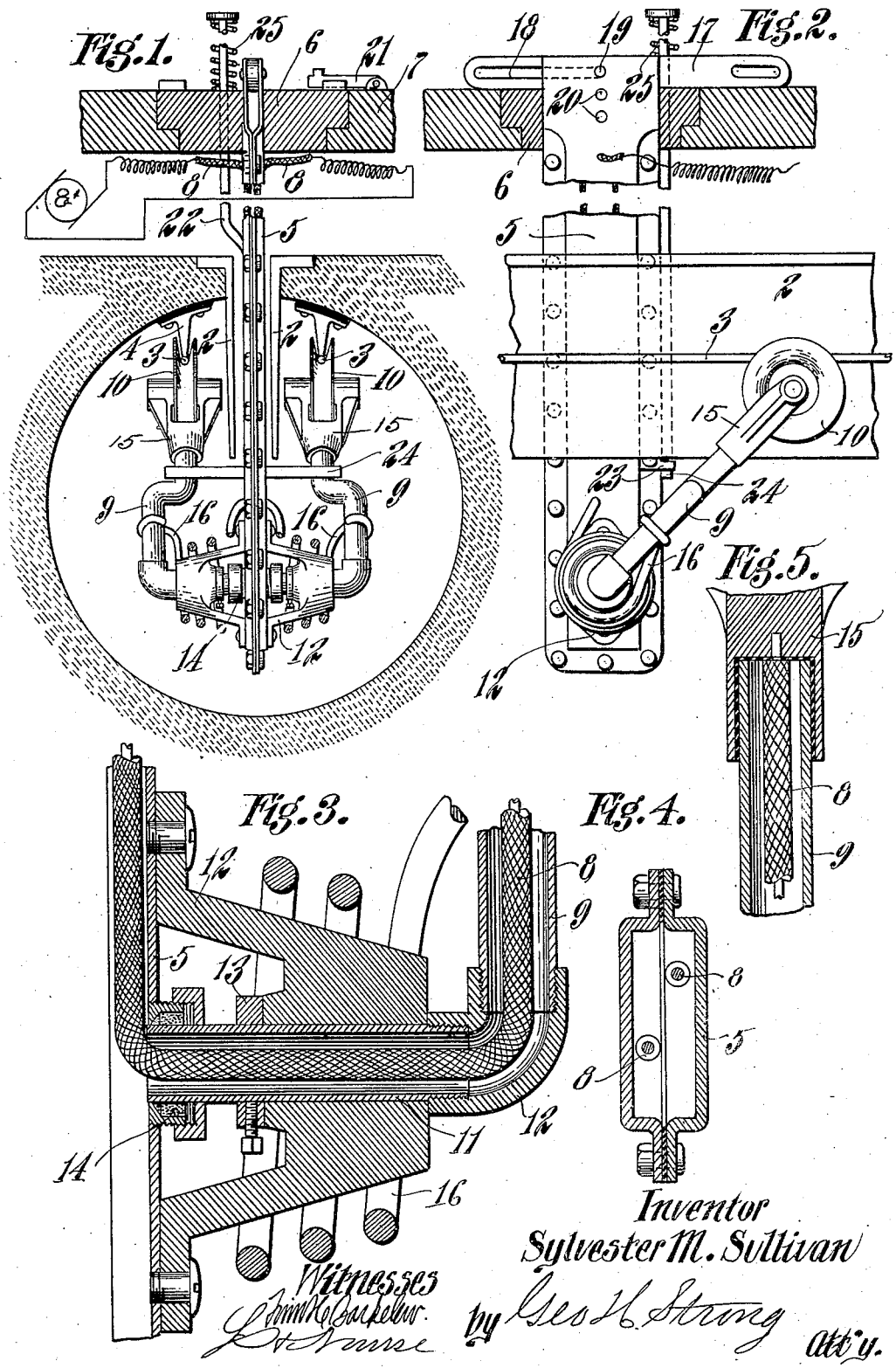

SYLVESTER M. SULLIVAN, OF SAN FRANCISCO, CALIFORNIA.

UNDERGROUND ELECTRIC RAILWAY.

No. 848,507.　　　　Specification of Letters Patent.　　　Patented March 26, 1907.

Application filed May 7, 1906. Serial No. 315,562.

*To all whom it may concern:*

Be it known that I, SYLVESTER M. SULLIVAN, a citizen of the United States, residing in the city and county of San Francisco and State of California, have invented new and useful Improvements in Underground Electric Railways, of which the following is a specification.

My invention relates to electric railways, and especially to those of the underground or conduit type.

My primary object is to render practicable the cheap and ready conversion of present cable systems to underground electric systems; and the invention comprehends the employment of the old cable conduit and slot for the accommodation of the trolley-wires and current-collectors.

It also includes a novel form of adjustable reversible current-collector.

The invention consists of the parts and the construction and the combination of parts, as hereinafter more fully described and claimed, having reference to the accompanying drawings, in which—

Figure 1 is a cross-section through a conduit and part of a car to show an end view of the invention. Fig. 2 is a side elevation of the invention. Fig. 3 is a detail in section of the journal for the trolley-arm. Fig. 4 is a cross-section of the trolley-standard. Fig. 5 is a sectional view showing the electrical connections with a trolley-wheel yoke.

A represents a conduit of any suitable description. This conduit is here assumed to be that of an ordinary street-cable railway having the usual slot through which the cable-grip has been adapted to operate. In conjunction with the slot I employ two guard flanges or angles 2, which, with the roof of the conduit, form housings to protect the trolley wires or rails 3 from the elements and against being tampered with. One of these conductors is preferably arranged on each side of the slot and behind a corresponding flange 2. These conductors may be both arranged to carry current in one direction, so that if one circuit gets out of order the other can be used, or, as I prefer, one wire will act as an outgoing conductor, while the other wire will act as a return-conductor. By this latter arrangement the usual dangers of employing a track-rail for return is avoided.

The conductors 3 are suitably supported on insulated standards 4. The current is taken from one conductor, passed up through the car and through the motors, and returned to the other conductor by the following means, which constitute the main features of my invention: 5 is a standard which is supported to slide vertically in a turn-table 6, carried by the car-body 7. The standard is preferably made in the form of two separable plates, as shown in Fig. 4, and adapted to be united at their edges to inclose a suitable water-tight channel for the accommodation of the insulated conductors 8. The standard 5 extends down through the slot into the conduit and carries the two hollow spring-actuated trolley-arms 9, which are pivotally mounted to swing in a vertical plane and which carry respective trolley-wheels 10, adapted to run on the under side of respective conductors 3. It is one of the main objects of my invention to so construct my current-collecting devices that they will operate even when partly submerged, as in case the conduit should be flooded. Therefore it is essential that the conductors 8, which take the current to and from the car, should be protected from moisture at all times. While any one of a variety of constructions might be employed to produce the desired end, I have here shown the trolley-arms 9 as made of separable pipe-sections and elbows, with each having a horizontal part 11 turnable in a suitable bearing in the hub of a spider 12. One of these bearings is arranged on each side of the standard 5, near its lower end, and each bearing part 11 is adapted to open into the channel in the standard 5. Suitable means, as the elbow 12, into which the section 11 and arm 9 screw, is adapted to bear against the outer end of the hub of the spider to limit the lengthwise movement of the part 11 in one direction, and a collar 13 or equivalent means carried by the part 11 is adapted to bear on the opposite side of the hub to limit the movement of the part 11 in the opposite direction. The inner end of the part 11 turns in a suitable packing-box 14, carried by standard 5. One of the conductors 8 passes through a corresponding part 11 and arm 9 and is electrically connected with a trolley-wheel yoke 15, as shown in Fig. 5, the arm 9 being suitably insulated from the yoke, as shown. The other conductor 8 passes up through the other arm and connects in a similar manner to the other yoke 15, both yokes being in suitable electric connection with their respective trolley-wheels. Each trolley-wheel is normally pressed upward against its respective trolley-wire by means of a spring 16, which has one end secured to the standard and the other to a respective arm 9. Thus it will be observed that each trolley-arm is capable of an independent pivotal movement in a vertical plane and that no water can penetrate into the interior of either the arms or standard 5. Consequently the conduit could be filled with water up to a level below the juncture of the yokes with the arms, and there will be no danger of short-circuiting between the conductors 3. At some suitable point above the surface of the road-bed the conductors 8 are passed out through the sides of the standard 5 and connect in a suitable manner to the car-body to permit of the proper utilization of the current on the car.

It is not necessary for the purpose of the present invention to show the electrical connections on the car or the protecting means of connection with the conductors 8, since they are well known in the art and form no part of the present invention. However, I have diagrammatically represented the conductors 8 as leading to the motor 8'.

The standard 5 is movable and adjustable vertically in the block or turn-table 6 by any appropriate means. I have shown a lever 17, having a longitudinal slot 18 at one end, in which a pin 19, adjustable in perforations 20 in standard 5, is adapted to engage. The standard is supported in operative position on the car by positioning the lever 17 crosswise of the turn-table, as shown in Fig. 2.

The pressure of the trolley-wheels 10 on the trolley-wires 3 is regulated by inserting the fulcrum-pin 19 into one or the other of the holes 20 in the standard. By pulling the lever 17 to bring the pin 19 against the outer end of slot 18 the lever may be turned into line with the standard to permit the latter to be lowered for the purpose of reversing the trolley-arms and causing them to incline in the opposite direction, as is necessary to be done when the direction of the travel of the car is reversed.

The rotative movement of the turn-table is limited by suitable means, as the latch member 21. In order to disconnect the trolley-wheels from the trolley-wires at any time, as in crossing the trolley-wire of an intersecting line or for any other reasons, I provide suitable means, as the rod 22, which is slidable in the turn-table 6 and in a strap 23, fixed to the standard 5. The lower end of the rod 22 has a cross-head 24 above the trolley-arms 9. This cross-head normally acts as a stop to limit the upward movement of the arms, and so prevent them from swinging to the other side of the center of the standard 5.

The cross-head and rod 22 are normally pushed upward out of interference with the operation of the trolley-arms by suitable means, as the spring 25. If it is desired to depress the trolley-arms, it is only necessary for the operator to place his foot on the end of the rod 22 and push down.

The two trolley-arms are turnable in their journals independently of one another, so that each may adapt itself to any inequalities in the levels of the two trolley-wires.

While this system is designed particularly for use with cables-railway conduits, any other form of ditch, excavation, or housing for the conducting wire or rail and the current-collector might be employed.

Having thus described my invention, what I claim, and desire to secure by Letters Patent, is—

1. In an electric railway, the combination of two conducting-wires, a turn-table carried by the car, a standard adjustable vertically in said turn-table, two independently-operating trolley-arms, said arms being hollow and being pivotally mounted on the standard, current-collecting means carried by the arms, and conductors passing through the hollow of said arms and along the standard.

2. In an electric railway, the combination of two conducting-wires, a turn-table carried by the car, a standard adjustable vertically in the turn-table, said standard being formed of spaced plates, hollow trolley-arms pivotally mounted on the standard said arms having their interior passages communicating with the space between the plates of the standard, current-collecting means carried by the arms and engageable with the trolley-wire, and conductors leading from the current-collecting means through said arms and standard.

3. In an electric railway, the combination with a slotted conduit, of a trolley-wire in the conduit, a hollow standard carried by the car, a hollow trolley-arm pivotally mounted on the standard and having suitable water-proof joints therewith, insulated current-collecting means on the arm engaging said trolley-wire, and a suitable conductor housed in said standard and hollow arm and electrically connected with said current-collector.

4. In an electric railway, the combination with a slotted conduit, of a trolley-wire in the conduit, a hollow standard carried by the car, a hollow trolley-arm pivotally mounted on the standard and having suitable waterproof joints therewith, insulated current-collecting means on the arm engaging said trolley-wire, a suitable conductor housed in said standard and hollow arm and electrically connected with said current-collector, and means operative from the car for depressing said trolley-arm.

5. In an electric railway, the combination of a pair of conductors, a standard carried by the car, a pair of independently-operating spring-actuated current-collectors carried by the standard and engageable with said conductors, and means including a lever having a shiftable fulcrum said lever being operative from the car for disconnecting said collectors from the conductors.

6. In an electric railway, the combination of a pair of conductors, a standard carried by the car, a pair of independently-operating spring-actuated current-collectors carried by the standard and engageable with said conductors, and a single operating means including a lever and a shiftable fulcrum between the same and the standard for disconnecting said current-collectors from their conductors.

7. In an electric railway, the combination with a slotted conduit, of a current-conductor on each side of the slot in said conduit, a standard carried by the car and operative in said slot, a pair of independently-movable current-collectors on the standard engageable with respective of said conductors, and means including a longitudinally-slotted lever and a shiftable fulcrum therefor and connecting the lever with the standard, said lever being operative from the car for disengaging said current-collectors from their respective conductors.

8. In an electric railway, the combination with a slotted conduit, of a trolley-wire in the conduit, a standard supported from the car, a spring-actuated movable current-collector on the standard and engageable with said conductor, means including a slotted lever and a shiftable furcrum between the same and the standard, said lever being operative from the car and independent of the movement of the standard to disengage the current-collector from said conductor, and means carried by the car permitting said current-collector to be reversed.

In testimony whereof I have hereunto set my hand in presence of two subscribing witnesses.

SYLVESTER M. SULLIVAN.

Witnesses:
JAMES BOWLAN,
ELI LANDRY.